(12) United States Patent
Plaut et al.

(10) Patent No.: US 9,067,395 B2
(45) Date of Patent: Jun. 30, 2015

(54) LOW TEMPERATURE CURABLE EPOXY TAPE AND METHOD OF MAKING SAME

(75) Inventors: David J. Plaut, Minneapolis, MN (US); Sean M. Tsuji, Tokyo (JP); Chin Teong Ong, Singapore (SG); Siang Kwang Lee, Singapore (SG)

(73) Assignee: 3M Innovative Properties Company, St. Paul, MN (US)

( * ) Notice: Subject to any disclaimer, the term of this patent is extended or adjusted under 35 U.S.C. 154(b) by 54 days.

(21) Appl. No.: 13/817,176

(22) PCT Filed: Aug. 17, 2011

(86) PCT No.: PCT/US2011/048010
§ 371 (c)(1),
(2), (4) Date: Sep. 5, 2013

(87) PCT Pub. No.: WO2012/024354
PCT Pub. Date: Feb. 23, 2012

(65) Prior Publication Data
US 2013/0333838 A1    Dec. 19, 2013

(30) Foreign Application Priority Data
Aug. 20, 2010  (MY) .............................. PI2010003937

(51) Int. Cl.
*C09J 7/02*  (2006.01)
*B32B 37/14* (2006.01)
(Continued)

(52) U.S. Cl.
CPC ............... *B32B 37/14* (2013.01); *Y10T 156/10* (2015.01); *C08J 2363/00* (2013.01); *C08K 2201/001* (2013.01); *C08L 23/22* (2013.01);
(Continued)

(58) Field of Classification Search
CPC ..... C09J 7/0203; B32B 37/1284; B32B 37/14
USPC ......... 428/343; 156/307.1, 60, 307.7; 442/38, 442/58
See application file for complete search history.

(56) References Cited

U.S. PATENT DOCUMENTS 3,894,113 A    7/1975  Pagel
RE30,843 E    1/1982  Flint
(Continued)

FOREIGN PATENT DOCUMENTS

EP    0168188    1/1986
EP    0346809    12/1989
(Continued)

OTHER PUBLICATIONS

International Search Report for PCT International Application No. PCT/US2011/048010, mailed on Jan. 30, 2012, 4 Pages.

*Primary Examiner* — Daniel Lee (57) ABSTRACT

A low temperature curable epoxy tape is provided that can be useful as a semi-structural adhesive tape in the automotive, aerospace, and electronics industries to form metal-to-metal and metal-to-plastic bonds. The provided epoxy tape includes a curative layer. The curative layer includes a scrim, a binder layer at least partially enclosing the scrim, and a latent curative dispersed in the binder layer. The curative layer is coated and then dried of solvent. Then an epoxy layer is laminated to a top and a bottom of the curative layer. The epoxy tape is placed between two parts being bonded together and then heated to temperatures of bottom up to about 110° C. to activate and disperse the active curative. A semi-structural bond is formed. Also, a method of making the epoxy tape is provided.

20 Claims, 3 Drawing Sheets (51) Int. Cl.
*B32B 37/12* (2006.01)
*C08L 23/22* (2006.01)
*C09J 7/04* (2006.01)
*C09J 163/00* (2006.01)
*C08L 63/00* (2006.01)

(52) U.S. Cl.
CPC ............... *C08L 63/00* (2013.01); *C09J 7/0203* (2013.01); *C09J 7/043* (2013.01); *C09J 163/00* (2013.01); *B32B 37/1284* (2013.01)

(56) References Cited

U.S. PATENT DOCUMENTS

| | | |
|---|---|---|
| 5,648,407 A | 7/1997 | Goetz |
| 6,506,494 B2 * | 1/2003 | Brandys et al. ............ 428/402.2 |
| 6,703,124 B2 | 3/2004 | Kim |
| 2005/0272883 A1 | 12/2005 | Hadley |
| 2008/0081170 A1 | 4/2008 | Tilbrook |
| 2009/0076180 A1 | 3/2009 | Iwaya |

FOREIGN PATENT DOCUMENTS

| | | |
|---|---|---|
| EP | 0672707 | 9/1995 |
| JP | 09316303 | 12/1997 |
| JP | 10025334 | 1/1998 |
| JP | 3433878 | 8/2003 |
| WO | WO 01/46290 | 6/2001 |
| WO | WO 2010/072990 | 7/2010 |
| WO | WO 2010/091072 | 8/2010 |

* cited by examiner

LOW TEMPERATURE CURABLE EPOXY TAPE AND METHOD OF MAKING SAME

FIELD

The present disclosure relates to low temperature curable epoxy tape laminates and methods of making and using the same.

BACKGROUND

Semi-structural adhesives have been used in the automotive, aerospace, and electronics industries to form metal-to-metal bonds and metal-to-plastic bonds. Typically, in the electronics industry, semi-structural adhesives can be used to mechanically bond many components together in electronic devices. The semi-structural adhesives that are typically utilized in these applications can be one or two part epoxy systems that have a latent curative and can form a permanent bond when pre-adhesive components are exposed to an elevated temperature.

It is typical to make a semi-structural bonding tape by mixing reactive, pre-adhesive components with a latent curative and then coating the pre-adhesive mixture onto a liner. Optionally, a reinforcing fiber layer or scrim can be imbedded in the pre-adhesive mixture prior to curing in order to give the bonding tape more mechanical strength. Typically, latent curatives that are used to make semi-structural bonding tapes activate at temperatures greater than about 120° C.

SUMMARY

When semi-structural bonding tapes are used to bond components in electronic devices, the high curing activation temperatures can damage sensitive parts in the electronic device. Furthermore, conventional semi-structural bonding tapes can have limited shelf life due to reaction of the curative with solvent used in coating the pre-adhesive mixtures. Thus, there is a need for new semi-structural bonding tapes that can be cured at lower temperatures than about 120° C. and that have a longer storage life than conventional tapes and can be useful for bonding components such as those in electronic devices.

In one aspect, a tape is provided that includes a curative layer having a first side and a second opposing side, wherein the curative layer comprises a scrim, a binder layer at least partially enclosing the scrim, and a latent curative dispersed in the binder layer; a first epoxy layer disposed upon the first side of the curative layer; and a second epoxy layer disposed upon the second side of the curative layer.

In another aspect, a method of making an tape is provided that includes dispersing a latent curative for epoxy resins in a binder layer comprising a scrim, wherein the binder layer has two opposing sides, drying the binder layer, and laminating an epoxy resin to each of the opposing sides of the binder layer.

In yet another aspect, a method of using an epoxy tape on an electronic device is provided that includes laminating an epoxy tape to a first electronic component to form a laminate, applying a second electronic component to the laminate to form an assembly, and heating the assembly to cure the epoxy tape, wherein the epoxy tape comprises a curative layer having a first side and a second opposing side, a first epoxy layer disposed upon the first side of the curative layer and a second epoxy layer disposed upon the second side of the curative layer, and wherein the curative layer comprises a scrim, a binder layer at least partially enclosing the scrim, and a latent curative dispersed in the binder layer.

In this disclosure:

"curative layer" refers to the layer of the epoxy tape that includes the latent curative as well as the scrim and a binder;

"latent curative" refers to a catalyst, such as an amine catalyst, that is inactive until activated by a source of energy such as heat; and "scrim" refers to a woven or non-woven porous material that can be used as a reinforcement material for the epoxy adhesive tapes.

The above summary is not intended to describe each disclosed embodiment of every implementation of the present invention. The brief description of the drawings and the detailed description which follows more particularly exemplify illustrative embodiments.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The provided epoxy tape construction includes a curative layer having a first side and a second opposing side. The curative layer has a scrim, a binder at least partially enclosing the scrim, and a latent curative dispersed in the binder. The curative layer is the only layer that includes the curative until bonding is initiated by heating the epoxy tape to a temperature higher than the activation temperature of the latent curative. The provided epoxy tape construction also includes a first epoxy layer disposed upon the first side of the curative layer and a second epoxy layer disposed upon the second side of the curative layer. In some embodiments, there may be only a first epoxy layer disposed upon the first side of the curative layer and a different adhesive (activatable by the curative layer or not activatable by the curative layer) on the second opposing side of the curative layer. This different adhesive can be a pressure-sensitive acrylic adhesive, a moisture-curable or radiation-curable thermosetting adhesive, or a thermosetting adhesive with a low $T_g$ that has significant viscous flow at a temperature above room temperature but below the activation temperature of the curative layer. In some other embodiments, it is contemplated that the provided epoxy tape can have another material on the second opposing side of the curative layer that is not an adhesive.

The provided construction of the epoxy tape provides for longer shelf-life than similar constructions made by coating a solution containing the epoxy layer and the curative onto a scrim, removing the solvent, and storing the epoxy tape prior to bonding. The contact of the latent curative, particularly a latent curative having a low activation temperature, with the epoxy can allow slow curing of the epoxy caused by interaction of the latent curative with residual solvent that can remain in the epoxy tape. The provided epoxy tape has a binder layer at least partially enclosing the scrim and it is this binder layer that contains the latent curative. The binder, polyisoprene in one embodiment, is not reactive with the curative—even above its activation temperature. At least a portion of the epoxy layer does not include a curative or latent curative. The function of the binder is to hold the dispersed latent curative in the scrim. The epoxy resin layers can be laminated to the curative layer after drying. The resulting epoxy tape construction can have no residual solvent in the epoxy layer and no curative in the epoxy layer until the activation temperature of the latent catalyst if exceeded. After activation, the curative (usually an amine or imidazole) is released, can migrate through the binder and into the epoxy layer or layers, and then can begin the process of building a semi-structural bond between two bondable substrates. The constructions of the epoxy tape and the methods of making and using the epoxy tape are herein described.

Curative Layer

The provided curable epoxy tape includes a curative layer having a scrim. The scrim can be any fabric, fiber, cloth, mesh netting, or any non-woven material that is well known to those of ordinary skill in the art. In some embodiments, the scrim can be a non-woven fabric made by spinning and bonding continuous filaments of nylon into a flat, smooth, strong crisp fabric. Typical scrims useful to make the provided epoxy tapes include CEREX fabrics, available from Cerex Advanced Fabrics, Inc., Pensacola, Fla. The curative layer has a first side and a second opposing side. The curative layer includes a scrim, a binder layer at least partially enclosing the scrim and a latent curative dispersed in the binder layer. In some embodiments, the binder layer can completely enclose the scrim. Table 1 provides exemplary chemicals and materials used to form various layers of the epoxy tape. The typical ratios, the function of each material, and its effect on the final layer are also shown. In some embodiments, the scrim layer can contain the curative (FUJICURE FXR-1020, available from Fuji Kasei Industries) and high MW polyisobutylene (PIB) (OPPANOL B200, BASF, Mt. Olive, N.J.). The curative, FXR-1020, contains aminoalkyl-imidazole with a $NH_2$ functional group and a cyclic amine with two nitrogen atoms with an active hydrogen. The polyisobutylene can be dissolved into heptane to form a solution, and then the powder curative can be dispersed into this solution. Heptane is a suitable solvent because the curative does not dissolve in heptane and disperses well in that solvent.

The polyisobutylene can act as a binder for the latent curative dispersant and can bind the curative to the scrim layer. The polyisobutylene also can help to create a stable and even dispersion of the curative in the coating mixture prior to coating onto the scrim. The polyisobutylene can also modify the viscosity of the solution to help with coating uniformity. The polyisobutylene also can act as a lubricant during coating and can function as a binder between the scrim and the curative after coating and during drying (solvent removal).

Although polyisobutylene is discussed as being the binder, other binder materials can be used. The important properties of the binder are that it can help to disperse the latent curative during coating and can support the curative in a stable manner until activation of the epoxy tape that is contained within. Additionally, the binder needs to be able to allow the activated curative to migrate easily through it and into the epoxy resin to form a strong semi-structural bond. Typical binders include, but are not limited to, well-known elastomers such as natural or synthetic rubbers, polyisoprenes, butyl rubbers, polybutadienes, styrene-butadiene rubbers, nitrile rubbers, ethylene propylene rubbers, polyacrylic rubber, ethylene-vinyl acetated or any other elastomers that have properties such as those described above.

In some embodiments, the scrim can be electrically conductive. For example, the scrim can include a nickel-coated carbon scrim. Exemplary nickel-coated carbon scrims include carbon fiber nonwoven scrims such as OPTIMAT 203 SERIES 20301 scrim, available from Optimat, Ltd., Glasgow, United Kingdom. Epoxy tapes that utilize conductive scrims can enable the grounding of two metal parts that are bonded together—replacing the need for spot welding. Other useful conductive scrims are nickel-coated copper scrims useful as, for example, a shield in electromagnetic interference filters.

In other embodiments, the scrim can be a hot melt scrim with a melting point of about 140° C. which is above the bonding temperature used to cure the epoxy resin and curative and below a temperature that may cause damage to any plastics being bonded. If there is a need to rework parts, particularly parts contained in an electronic device, the bonded parts can be heated, disassembled for rework or replacement, and then cooled to reform the bond. In other embodiments the scrim can be a thermoplastic scrim. Typical thermoplastic scrims include polyolefin or ethylene vinyl acetate (EVA) scrims that are useful in clothes manufacture and are available, for example, from DuPont, Wilmington, Del.

Curative

The provided curable epoxy tape includes a latent curative. Latent curatives useful in the provided epoxy tape include microencapsulated imidazole curatives. Microencapsulated imidazole curatives are well known. They can have various activation temperatures. Generally, the microencapsulated imidazoles are coated with a polymer coating that keeps them insulated from the resin into which they can be incorporated. Microencapsulated imidazoles, that can have activation temperatures as low as about 80° C., are commercially available as, for example, NOVACURE HX3722, available from Asahi Kasei Chemicals, Tokyo, Japan, which is a mixture of a microencapsulated imidazole and a bisphenol A type epoxy resin in a weight ratio of 1:2. Another exemplary latent curative that is activated at 80° C. is FUJICURE FXR 1020, available from Fuji Kasei Industries, Tokyo, Japan. Other latent catalysts are available from Landec Corporation, Menlo Park, Calif. Other latent catalysts within the scope of this disclosure include other encapsulated amines or amine-derivatives.

Other suitable thermally activated curing agents (curatives) can include substituted imidazoles, such as 2-[beta-[2'-methylimidazolyl-(1')}]-ethyl-4,6-diamino-s-triazine (2MZ-A), 2,4-diamino-6-6[2'-methylimidazolyl-(1')]-ethyl-s-triazine isocyanurate adduct (2MA-OK), as provided by the Shikoku Company, Japan, and 4,5-diphenylimidazole and combinations thereof. Additional thermally activated curing agents suitable for use in epoxy resins are transition metal salt complexes of imidazole and substituted imidazoles, such as 1-methylimidazole/Cu(NO$_3$)$_2$.H$_2$O complex, 1-benzylimidazole/Cu(NO$_3$)$_2$.H$_2$O, 1-benzyl-2-methylimidazole/Cu(NO$_3$)$_2$.H$_2$O, 1-methylimidazole/Zn(NO$_3$)$_2$.H$_2$O, 1-methylimidazole/Ni(NO$_3$)$_2$.H$_2$O. Finally, thermally activated curing agents for epoxy resins can include metal imidazolates, such as zinc imidazolate and copper imidazolate.

Epoxy Layer

Epoxy resins that are useful in the compositions of the present disclosure are of the glycidyl ether type. Useful resins include those having the general Formula (I):

wherein R comprises one or more aliphatic, cycloaliphatic, and/or aromatic hydrocarbon groups, optionally wherein R further comprises at least one ether linkage between adjacent hydrocarbon groups; and n is an integer greater than 1. Generally, n is the number of glycidyl ether groups and must be greater than 1 for at least one of the epoxy resins of Formula I present in the adhesive. In some embodiments, n is 2 to 4, inclusive.

Exemplary epoxy resins include glycidyl ethers of bisphenol A, bisphenol F, and novolac resins as well as glycidyl ethers of aliphatic or cycloaliphatic diols. Examples of commercially available glycidyl ethers include diglycidylethers of bisphenol A (e.g. those available under the trade names EPON 828, EPON 1001, EPON 1310 and EPON 1510 from Hexion Specialty Chemicals GmbH, Rosbach, Germany; those available under the trade name D.E.R. from Dow Chemical Co. (e.g., D.E.R. 331, 332, and 334); those available under the trade name EPICLON from Dainippon Ink and Chemicals, Inc. (e.g., EPICLON 840 and 850) and those available under the trade name YL-980 from Japan Epoxy Resins Co., LTD.); diglycidyl ethers of bisphenol F (e.g. those available under the trade name EPICLON from Dainippon Ink and Chemicals, Inc. (e.g., EPICLON 830)); glycidyl ethers of novolac resins (e.g., novolac epoxy resins, such as those available under the trade name D.E.N. from Dow Chemical Co. (e.g., D.E.N. 425, 431, and 438)); and flame retardant epoxy resins (e.g. D.E.R. 580, a brominated bisphenol type epoxy resin available from Dow Chemical Co.). In some embodiments, aromatic glycidyl ethers, such as those prepared by reacting a dihydric phenol with an excess of epichlorohydrin, may be preferred. In some embodiments, nitrile rubber modified epoxies may be used (e.g., KELPDXY 1341 available from CVC Chemical).

Examples of useful multifunctional glycidyl ether epoxy resins that are diglycidyl ethers of bisphenol A include, but are not limited to, those having the trade designations EPON Resins 825, 826, and 828, available from Resolution Performance Products, Houston, Tex.; D.E.R. 330, 331, and 332 resins, available from Dow Chemical Company, Midland, Mich.; and ARALDITE GY 6008, GY 6010, and GY 2600 resins, available from Vantico, Brewster, N.Y.

Examples of useful multifunctional glycidyl ether epoxy resins that are diglycidyl ethers of bisphenol F include, but are not limited to those having the trade designations EPON Resin 862 resin, available from Resolution Performance Products, Houston, Tex.; and ARALDITE GY 281, GY 282, GY 285, PY 306, and PY 307 resins, available from Huntsman Chemical, East Lansing, Mich.

Other useful multifunctional glycidyl ether epoxy resins include those epoxy resins having more than 2 glycidyl groups on average within a molecule. Specific examples of the glycidyl ether epoxy resin include multifunctional phenol novolak-type epoxy resins (synthesized by reacting phenol novolak with epichlorohydrin), cresol novolak epoxy resins, and bisphenol A novolak epoxy resins. Examples of commercially available multifunctional glycidyl ether epoxy resins include those epoxy resins having the trade designations EPON 1050, EPON 160, EPON 164, EPON 1031, EPON SU-2.5, EPON SU-3, and EPON SU-8, available from Resolution Performance Products, Houston, Tex.; the "DEN" series of epoxy resins, available from Dow Chemical, Midland Mich.; and TACTIX 756, and TACTIX 556 epoxy resin, available from Huntsman Chemical, East Lansing, Mich.

In some embodiments, the epoxy resin has a molecular weight of at least 170 g/mole, or at least 200 g/mole. In some embodiments, the epoxy resin can have a molecular weight of less than 10,000 g/mole, or even less than 3,000 g/mol. In some embodiments, the epoxy equivalent weight of the resin can be at least 50 g/mole, or at least 100 g/mole of epoxy equivalents. In some embodiments, the epoxy equivalent weight of the resin can be less than 500 g/mole, or even less than 400 g/mole of epoxy equivalents In some embodiments, the compositions of the present disclosure include at least 20 weight percent (wt %), at least 25 wt %, or even at least 30 wt % epoxy resin, based on the total weight of the composition. In some embodiments, the compositions of the present disclosure include less than 90 wt %, less than 75 wt %, or even less than 60 wt % epoxy resin, based on the total weight of the composition. As used herein, the phrase "total weight of the composition" refers to the combined weight of both components, i.e., the base resin component and the accelerator component.

The epoxy layer can contain both solid epoxy resins and liquid epoxy resins. Solid epoxy resins can be utilized to give stability to the resulting cured-epoxy layer. Solid epoxy resins can include, for example, bisphenol A-type epoxy resins available under the trade name EPICLON, available from DIC Corporation, Tokyo, Japan. Liquid epoxy resins can include any epoxy resins which fulfill the sole requirement that they be in a liquid state at room temperature. Useful liquid epoxy resins include those based upon bisphenol A, bisphenol F, bisphenol, phenol novolak, and cresol novolak as are well know by those of ordinary skill in the art. One benefit of liquid epoxy resins is that they can increase tack. The epoxy resins of these species may be used either singly or in the form of a combination of two or more members, depending on the requirement for improving the special qualities of a coating film to be obtained. A useful exemplary liquid epoxy is ZX 1059 also available from DIC Corporation.

The epoxy layer may also contain other property modifiers such as impact modifiers, extenders, processing aids, plasticizers, tackifiers, or other well-known additives that are known by those of ordinary skill in the art to modify polymer properties. In some embodiments, an elastomer such as, for example, nitrile-butadiene rubber can be added in small amounts to increase the processibility of the epoxy layer.

Adjuvants such as colorants, antioxidants, flow agents, bodying agents, flatting agents, silane coupling agents, inert fillers, binders, blowing agents, fungicides, bactericides, surfactants, plasticizers, and other additives may optionally be added to the epoxy tape compositions as is known to those skilled in the art. The additives can be also substantially unreactive, such as fillers both inorganic and organic. The adjuvants, if present, are added in an amount effective for their known purpose in the art.

The epoxy layer can be made by dissolving the various epoxy resins, property modifiers, and adjuvants in a solvent such as methyl ethyl ketone. The solution can be coated onto silicone coated release paper using familiar methods such as knife-coating or bar-coating. The coated layer on a release liner can be dried at room temperature or elevated temperature to remove solvent. The coated and dried epoxy layer can then be used to laminate to the curative layer as described and illustrated below.

Process of Making Epoxy Tape

Figure 1A:
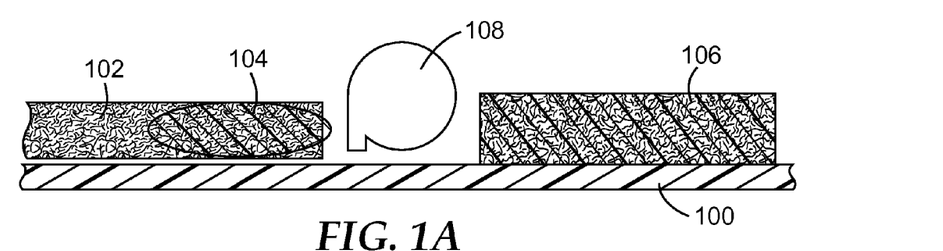
FIGS. 1A-1C are sequential side views of a process of making an embodiment of a provided epoxy tape.
Figure 1B:
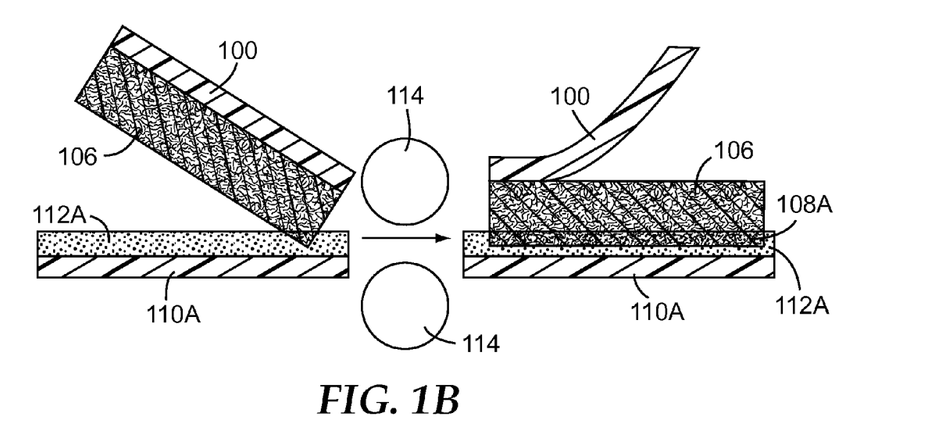
Figure 1C:
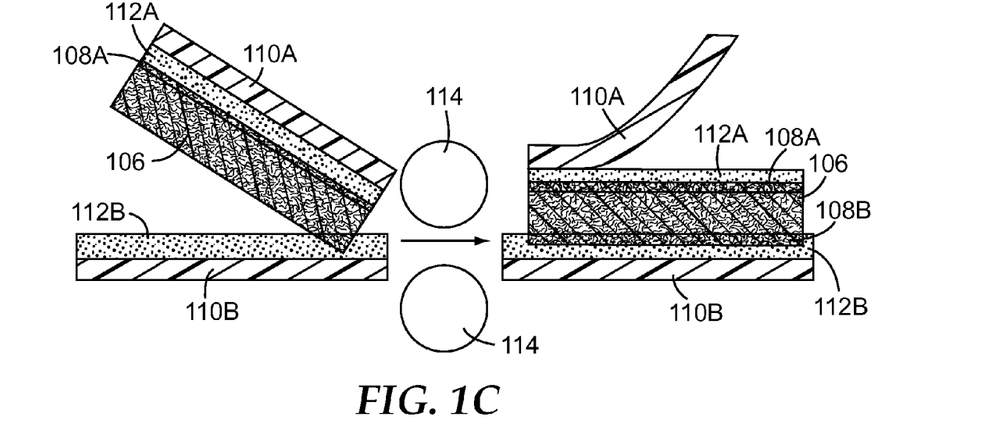

The epoxy layer can be laminated onto both sides of the scrim layer (as shown in FIGS. 1B and 1C). The last step involves heat lamination at 80° C. so the epoxy layer softens and disperses into the curative/scrim layer. This ensures a homogenous film.

The curable epoxy tape can be made by first making a curative layer as described above and illustrated in FIG. 1A. FIG. 1A is a schematic illustration of an embodiment of a first step of a process of making the curative layer. Porous scrim 102 is aligned atop silicone release liner 100. A latent curative in solvent dispersed in a binder 104 as shown on the left side of FIG. 1A. Scrim 102 containing binder 104 atop liner 100 is then run through comma coater 108 to disperse binder-curative 104 into scrim 102. After being processed through comma coater 108, scrim-binder dispersion 106 on liner 100 is produced. This scrim-binder dispersion 106 is dried at elevated temperature to remove coating solvent and any other volatiles.

Separately, in one embodiment, a first epoxy layer is produced by dissolving a solid epoxy resin, a liquid epoxy resin, property modifiers and adjuvants in an appropriate solvent to form a solution and then coating the solution onto first release liner 110A. After solvent removal, the result is first epoxy layer 112A coated onto first release liner 110A as shown in FIG. 1B. Scrim-binder dispersion 106 on release liner 100 is then laminated to first epoxy layer 112A on first release liner 110A using pressure rollers. After lamination, release liner 100 is removed for further processing. The result is a laminate on first release liner 110A that includes scrim-binder dispersion 106 laminated to first epoxy layer 112A. Overlap portion 108A of scrim-binder layer 106 is embedded into first epoxy layer 112A but does not penetrate through the epoxy layer 112A.

In one embodiment, a second epoxy layer is produced by a similar process as that for the first epoxy layer 112A to produce second epoxy layer 112B on second release liner 110B. FIG. 1C shows the lamination of the product made in FIG. 1B with second epoxy layer 112B on second release liner 110B. First release liner 110A is then removed before laminating the epoxy tape to a first substrate.

Figure 2:
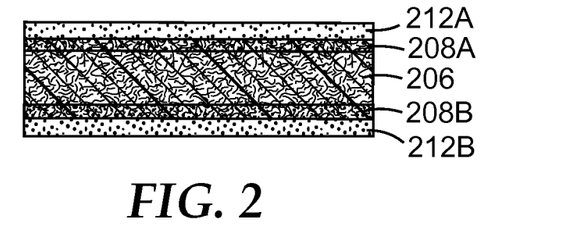
FIG. 2 is side view illustration of an embodiment of a provided epoxy tape.

FIG. 2 is an illustration of an embodiment of a provided curable epoxy tape. The illustrated epoxy tape is the product produced in the process illustrated in FIGS. 1A-1C with liners removed. This embodiment includes scrim-binder dispersion 206 that has been laminated on one side to first epoxy layer 212A and on the opposite side to second epoxy layer 212B. Scrim-binder dispersion 206 penetrates slightly into first epoxy layer 212A and second epoxy layer 212B so that there are small zones 208A and 208B that penetrate slightly into first epoxy layer 212A and second epoxy layer 212B, respectively.

Method of Using Epoxy Tape

Figure 3A:
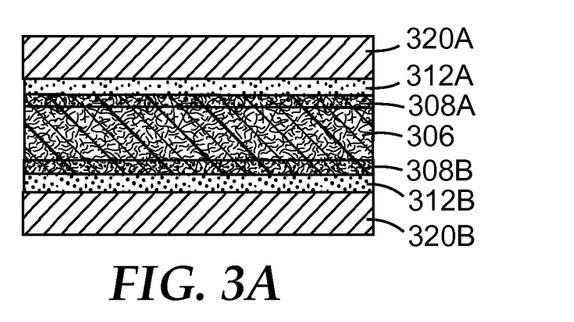
FIGS. 3A-3B side view illustrations of the process of using a provided epoxy tape to form a metal-to-metal bond.
Figure 3B:
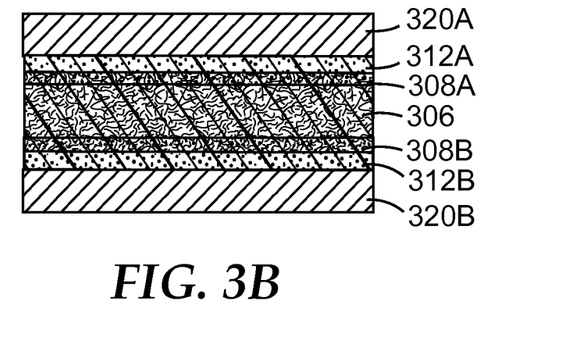

An embodiment of a method of using the curable epoxy tape is illustrated in FIGS. 3A and 3B. FIG. 3A illustrates the curable epoxy tape from FIG. 2A that has been laminated on one side to first metal substrate 320A and on the other side to second metal substrate 320B. First metal substrate 320A and second metal substrate 320B can be metallic components in an electronic device. In FIG. 3A, scrim-binder dispersion 306 (in which the scrim may be electrically conductive) penetrates slightly into both first epoxy layer 312A and second epoxy layer 312B.

The pre-bonded article (epoxy tape plus two metal substrates) shown in FIG. 3A is then heated to a temperature greater than the temperature needed to activate the latent curative in scrim-binder dispersion 306 but less than a temperature that can cause significant damage to an electronic device that contains the substrates to be bonded. Typically, the pre-bonded article is heated to a temperature of less than about 110° C. for a period of 1 to 5 minutes. Then curing proceeds at room temperature as the activated curative disperses into the epoxy resin and curing proceeds. The resulting bonded article is illustrated in FIG. 3B. In the embodiment shown in FIG. 3B, first metal substrate 320A is bonded to second metal substrate 320B. First epoxy layer 312A and second epoxy layer 312B have now cured into scrim-binder dispersion 306 and have formed structural bonds to both metal substrates 320A and 320B.

The amount of heat required for curing and the amount of the curative used will vary depending on the particular curable composition used and the desired application of the cured product. Suitable sources of heat to cure the compositions of the invention include induction heating coils, hot bar bonders, ovens, hot plates, heat guns, infrared (IR) sources including lasers, microwave sources, and the like.

Thermal Bonding Film

A thermal bonding film can be laminated one of the epoxy layers of the provided epoxy tape construction. The thermal bonding film layer can be used when bonding a metal component to a plastic component. When the epoxy tape includes a thermal bonding film, the thermal bonding film layer can be placed adjacent to the plastic component and the epoxy layer (on the opposite side of the epoxy tape) can be adjacent to the metal component. An exemplary thermal bonding epoxy tape that can be useful in the provided epoxy tape construction is 3M BONDING FILM 790A, available from 3M, St. Paul, Minn. 3M Bonding Film 790A is a high heat resistance, flexible, light colored, thermoplastic adhesive bonding film which exhibits good adhesion to a variety of substrates.

Figure 4:
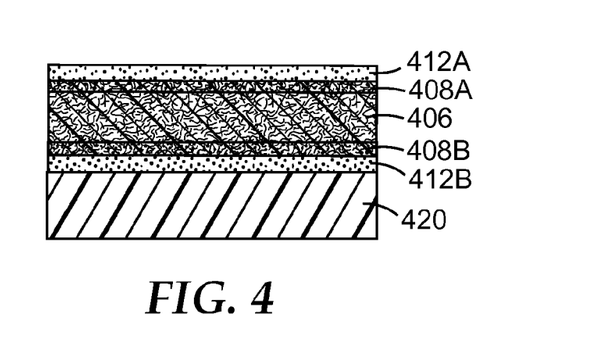
FIG. 4 is side view illustration of an embodiment of a provided epoxy tape that includes a thermal bonding film.

FIG. 4 is an illustration of an embodiment of an epoxy tape construction that is laminated on one side (in this illustration, on the side with second epoxy layer 412B) with thermal bonding tape 420. The result is the article illustrated in FIG. 4 that includes scrim-binder dispersion 406 flanked on one side by first epoxy layer 412A and on the other side by second epoxy layer 412B. As in the other illustrated embodiments, there are small zones 408A and 408B, respectively in which scrim-binder dispersion 406 penetrates slightly into first epoxy layer 412A and second epoxy layer 412B.

Objects and advantages of this invention are further illustrated by the following examples, but the particular materials and amounts thereof recited in these examples, as well as other conditions and details, should not be construed to unduly limit this invention.

EXAMPLES

TABLE 1

Materials

| Layer | Name | Ingredient | Typical ratio | Purpose | Increasing will . . . |
|---|---|---|---|---|---|
| Epoxy layer | EPICLON 1055 | solid epoxy | 50 | diglycidyl ether of bisphenol A (DGEBA) epoxy to form film | increase stability of film, increase life |
| | ZX1059 | liquid epoxy | 50 | DGEBA epoxy to give tack | increase tack, increase flow during cure, decrease life |
| | NIPOL 1001 | NBR rubber | 8 | Elastomer to enable single film | decrease strength, increase processability |
| | A-187 | silane coupling agent | 1 | Increases OLSS with metals | increase adhesion to metals |
| | Methyl ethyl ketone | Methyl ethyl ketone | 100 | Solvent | |
| Scrim layer | CEREX (75 um) | non-woven scrim | 50 (10 g/m$^2$) | Gives framework and processability | increasing density will lower OLSS |
| | FXR1020 | latent curative | 100 (20 g/m$^2$) | Low temperature curative | increases OLSS until certain threshold |
| | OPPANOL B200 | polyisobutylene rubber | 10 (2 g/m$^2$) | Enables stable dispersion of curative, controls flow, smoothness. Acts as binder for curative onto scrim and scrim onto the liner | increase viscosity |

Test Methods
Overlap Shear Adhesion Test Method (OLSS)

Test panels measuring 2.5 cm wide by 10.2 cm long of aluminum were used to evaluate overlap shear adhesion. The bonding surfaces of the panels were cleaned by lightly abrading them using a 3M SCOTCH-BRITE 7447 scouring pad (maroon colored), followed by an isopropyl alcohol wipe to remove any loose debris. A bead of adhesive was then dispensed along one end of a test panel, about 6.4 mm (0.25 inch) from the edge. The panels were joined together face to face along their length to provide an overlap bond area measuring approximately 1.3 cm long and 2.5 cm wide (0.5 inch by 1 inch). A uniform bond line thickness was provided by sprinkling a small amount of 0.2 mm (0.008 inch) diameter solid glass beads on the adhesive before joining the two test panels together. The bonded test panel samples were allowed to dwell at 23° C. (room temperature) for at least 48 hours to ensure full cure of the adhesive. The samples were tested at 22° C. for peak overlap shear strength at a separation rate of 2.5 mm/minute (0.1 inch/minute). The reported values represent the average of three samples.

Rate of Strength Buildup Test Method

Six aluminum test panels measuring 10.2 cm long by 2.5 cm wide by 1.6 mm thick ((4 inches by 1 inch by 0.063 inch) were cleaned and bonded as described above in the Overlap Shear Adhesion Test Method with the following modification. Spacer beads having a diameter of between 0.08 and 0.13 mm (0.003 and 0.005 inches) were used to control the bond line thickness. The bonded test panels were held at room temperature (23° C.) and evaluated for overlap shear strength at periodic intervals from the time the bonds were made.

Example 1

A curable epoxy film was including a curative/scrim layer with 0.21 g of curative (FXR 1020) and 0.41 g epoxy (combination of EPICLON 2055 and ZX 1059 in equal weight ratios) per 100 cm$^2$. The other materials used are shown in Table 1. The density of the scrim was 0.1 g per 100 cm$^2$. The scrim was a non-woven scrim with 75 μm mesh, CEREX, the binder was OPPANOL B200 polyisprene rubber. The powder curative can be observed, but after a month at room temperature storage, the curative dissolved into the epoxy matrix and some tack was lost.

The overlap shear strength versus aluminum was measured and the results are shown in Table 2 below. The recommended curing temperature and time for this specific curative was 80° C. for 30 min, although in this system the OLSS only reached 62% of that when cured at 100° C. for 1 hour. This was most likely due to a non-homogenous system of the film where the curative is dispersed onto the scrim and diffusion is limited, as opposed to a 1-part epoxy paste where the curative is dispersed uniformly. Further studies on the dispersity on the scrim may lead to better OLSS properties at lower temperatures and shorter cure times.

Figure 5:
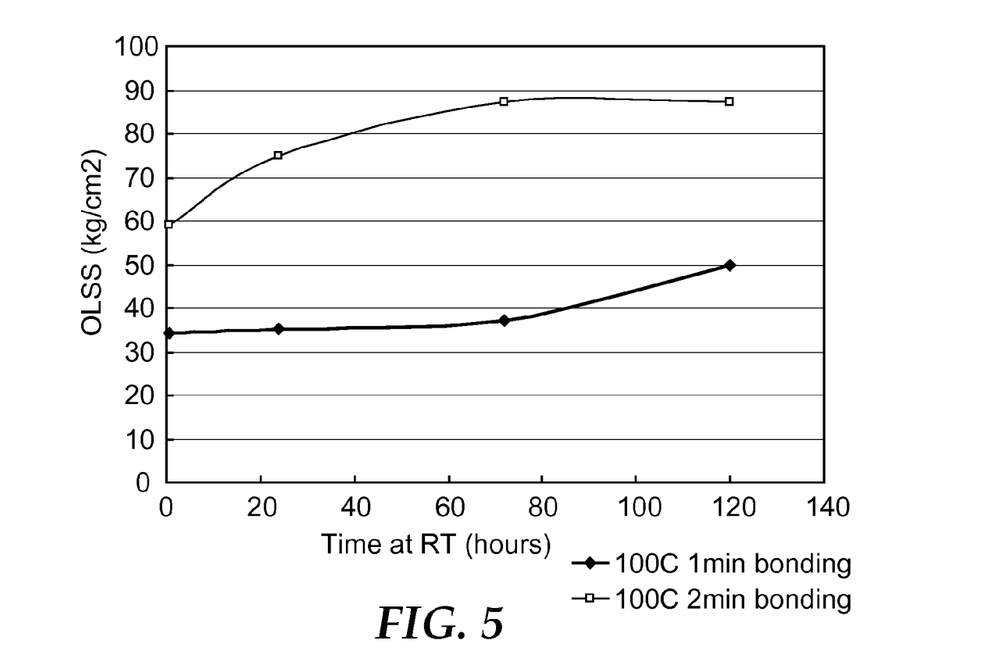
FIG. 5 is a graph of the build of overlap shear strength (OSS) measured in $kg/cm^2$ vs. time at room temperature of aluminum adherents bonded for 1 or 2 minutes at 100° C.

It has been shown in the 1-part epoxy system of EW2050 (available from 3M, St. Paul, Minn.), which uses the same curative, that the system that employs this curative shows heat trigger properties; that is, after the adhesive is partially cured above some threshold temperature and time and left to sit at room temperature, adhesion builds up during this "sitting period". The adhesion build-up measured by overlap shear strength on aluminum adherents bonded at 100° C. for 1 and 2 minutes using a heat bonder at 0.13 MPa is shown in FIG. 5. For the sample bonded at 100° C. for 2 minutes, the initial OLSS was 60 kg/cm$^2$, and after sitting at room temperature for 120 hours, the OLSS increased to 87 kg/cm$^2$. The increase was not as drastic as observed for EW2050 one-part thermosetting epoxy adhesive and this is most likely a result of the non-uniform dispersion of the curative and limited diffusion of the curative into the epoxy matrix during the bonding process. This increase may arise from the generation of —OH groups within the epoxy matrix during the heating process and the continued reaction of the —OH groups with the epoxy group using the tertiary amine as a catalyst during the sitting period.

To check the shelf life of the film, the exemplary epoxy film was cured at 100° C. for 1 hour after storing at room temperature for 30 days. The OLSS dropped from 115 kg/cm$^2$ to 106 kg/cm$^2$ when the sample was kept at room temperature for 30 days (Table 2).

TABLE 2

Overlap Shear Strength of Example 1

| Temperature and time for oven cure | OLSS vs Al (kg/cm²) |
|---|---|
| 80° C. for 30 min | 71 |
| 80° C. for 1 hr | 92 |
| 100° C. for 30 min | 104 |
| 100° C. for 1 hr | 115 |
| 100° C. for 1 hr after 30 day room temperature storage | 106 |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited in this disclosure are herein incorporated by reference in their entirety.

Following are exemplary embodiments of the provided low temperature curable epoxy tape and method of making same.

Embodiment 1 is a tape comprising: a curative layer having a first side and a second opposing side, wherein the curative layer comprises: a scrim; a binder layer at least partially enclosing the scrim; and a latent curative dispersed in the binder layer; a first epoxy layer disposed upon the first side of the curative layer; and a second epoxy layer disposed upon the second side of the curative layer.

Embodiment 2 is a tape according to embodiment 1, wherein the scrim comprises a fabric, a fiber, a cloth, a mesh netting, or a nonwoven material.

Embodiment 3 is a tape according to embodiment 1, wherein the scrim is electrically conductive.

Embodiment 4 is a tape according to embodiment 1, wherein the binder layer comprises a high molecular weight polybutylene.

Embodiment 5 is a tape according to embodiment 1, wherein the latent curative comprises an imidazole.

Embodiment 6 is a tape according to embodiment 5, wherein the latent curative activates at a temperature of less than about 120° C.

Embodiment 7 is a tape according to embodiment 5, wherein the latent curative activates at a temperature of between about 75° C. and 85° C.

Embodiment 8 is a tape according to embodiment 1, wherein at least one of the first epoxy layer and the second epoxy comprises a solid epoxy resin and a liquid epoxy resin at room temperature.

Embodiment 9 is a tape according to embodiment 8, wherein at least one of the solid epoxy resin and the liquid epoxy resin comprises a diglycidyl ether of bisphenol A.

Embodiment 10 is a tape according to embodiment 1, further comprising a nitrile butadiene rubber.

Embodiment 11 is a tape according to embodiment 1, further comprising at least one of colorants, antioxidants, flow agents, bodying agents, flatting agents, silane coupling agents, inert fillers, binders, blowing agents, fungicides, bactericides, surfactants, and plasticizers.

Embodiment 12 is a tape according to embodiment 3, further comprising at least one thermal bonding film in contact with at least one of the first epoxy layer or the second epoxy layer.

Embodiment 13 is a method of making an epoxy tape comprising: dispersing a latent curative for epoxy resins in a binder layer comprising a scrim, wherein the binder layer has two opposing sides; drying the binder layer; and laminating an epoxy resin to each of the opposing sides of the binder layer.

Embodiment 14 is a method of making an epoxy tape according to embodiment 13, wherein the latent curative activates at a temperature of between about 75° C. and 85° C.

Embodiment 15 is a method of making an epoxy tape according to embodiment 13, wherein the binder comprises a high molecular weight polyisobutylene.

Embodiment 16 is a method of making an epoxy tape according to embodiment 13, wherein the epoxy resin comprises a solid epoxy resin and a liquid epoxy resin at room temperature.

Embodiment 17 is a method of making an epoxy tape according to embodiment 16, wherein at least one of the solid epoxy resin and the liquid epoxy resin comprises a diglycidyl ether of bisphenol A.

Embodiment 18 is a method of using an epoxy tape on an electronic device comprising: laminating an epoxy tape to a first electronic component to form a laminate; applying a second electronic component to the laminate to form an assembly; and heating the assembly to cure the epoxy tape, wherein the epoxy tape comprises a curative layer having a first side and a second opposing side, a first epoxy layer disposed upon the first side of the curative layer and a second epoxy layer disposed upon the second side of the curative layer, and wherein the curative layer comprises a scrim, a binder layer at least partially enclosing the scrim, and a latent curative dispersed in the binder layer.

Embodiment 19 is a method of using an epoxy tape on an electronic device according to embodiment 18, wherein the first electronic component comprises metal or plastic and the second electronic component comprises metal or plastic.

Embodiment 20 is a method of using an epoxy tape on an electronic device according to embodiment 19, wherein heating is at a temperature of less than about 110° C.

The foregoing description of the preferred embodiment of the provided low temperature curable epoxy tape and method of making same have been presented for purposes of illustration and description. It is not intended to be exhaustive or to limit the invention to the precise forms disclosed, since many modifications or variations thereof are possible in light of the above teaching. All such modifications and variations are within the scope of the invention. The embodiments described herein were chosen and described in order to best explain the principles of the invention and its practical application, thereby to enable others skilled in the art to utilize the invention in various embodiments and with various modifications as are suited to the particular use contemplated thereof. It is intended that the scope of the invention be defined by the claims appended hereto, when interpreted in accordance with the full breadth to which they are legally and equitably suited.

What is claimed is:

1. A tape comprising:
   a curative layer having a first side and a second opposing side, wherein the curative layer comprises:
      a scrim;
      a binder layer at least partially enclosing the scrim; and
      a latent curative dispersed in the binder layer, wherein the binder layer is not reactive with the latent curative even above its activation temperature;
   a first epoxy layer disposed upon the first side of the curative layer; and a second epoxy layer disposed upon the second side of the curative layer.

2. A tape according to claim 1, wherein the scrim comprises a fabric, a fiber, a cloth, a mesh netting, or a nonwoven material.

3. A tape according to claim 1, wherein the scrim is electrically conductive.

4. A tape according to claim 3, further comprising at least one thermal bonding film in contact with at least one of the first epoxy layer or the second epoxy layer.

5. A tape according to claim 1, wherein the binder layer comprises a high molecular weight polybutylene.

6. A tape according to claim 1, wherein the latent curative comprises an imidazole.

7. A tape according to claim 6, wherein the latent curative activates at a temperature of less than about 120° C.

8. A tape according to claim 6, wherein the latent curative activates at a temperature of between about 75° C. and 85° C.

9. A tape according to claim 1, wherein at least one of the first epoxy layer and the second epoxy comprises a solid epoxy resin and a liquid epoxy resin at room temperature.

10. A tape according to claim 9, wherein at least one of the solid epoxy resin and the liquid epoxy resin comprises a diglycidyl ether of bisphenol A.

11. A tape according to claim 1, further comprising a nitrile butadiene rubber.

12. A tape according to claim 1, further comprising at least one of colorants, antioxidants, flow agents, bodying agents, flatting agents, silane coupling agents, inert fillers, binders, blowing agents, fungicides, bactericides, surfactants, and plasticizers.

13. A tape according to claim 1, wherein the binder layer comprises one of a synthetic rubber, polyisoprene, butyl rubber, polybutadiene, styrene-butadiene rubber, nitrile rubber, ethylene propylene rubber, polyacrylic rubber and ethylene-vinyl acetate.

14. A method of making an epoxy tape comprising:
dispersing a latent curative for epoxy resins in a binder layer comprising a scrim, wherein the binder layer has two opposing sides;
drying the binder layer; and
laminating an epoxy resin to each of the opposing sides of the binder layer, wherein the binder layer is not reactive with the latent curative even above its activation temperature.

15. A method of making an epoxy tape according to claim 14, wherein the latent curative activates at a temperature of between about 75° C. and 85° C.

16. A method of making an epoxy tape according to claim 14, wherein the epoxy resin comprises a solid epoxy resin and a liquid epoxy resin at room temperature.

17. A method of making an epoxy tape according to claim 16, wherein at least one of the solid epoxy resin and the liquid epoxy resin comprises a diglycidyl ether of bisphenol A.

18. A method of using an epoxy tape on an electronic device comprising:
laminating an epoxy tape to a first electronic component to form a laminate;
applying a second electronic component to the laminate to form an assembly; and
heating the assembly to cure the epoxy tape,
wherein the epoxy tape comprises a curative layer having a first side and a second opposing side, a first epoxy layer disposed upon the first side of the curative layer and a second epoxy layer disposed upon the second side of the curative layer, and
wherein the curative layer comprises a scrim, a binder layer at least partially enclosing the scrim, and a latent curative dispersed in the binder layer, and wherein the binder layer is not reactive with the latent curative even above its activation temperature.

19. A method of using an epoxy tape on an electronic device according to claim 18, wherein the first electronic component comprises metal or plastic and the second electronic component comprises metal or plastic.

20. A method of using an epoxy tape on an electronic device according to claim 19, wherein heating is at a temperature of less than about 110° C.

* * * * *